US010050465B2

(12) United States Patent  
Finckh

(10) Patent No.: US 10,050,465 B2  
(45) Date of Patent: Aug. 14, 2018

(54) SCREEN RACK FOR TWO SCREENS WITH A CASE FOR ELECTRIC COMPONENTS

(71) Applicant: MODINICE GmbH, Munich (DE)

(72) Inventor: Michael Finckh, Munich (DE)

(73) Assignee: MODINICE GmbH (DE)

( * ) Notice: Subject to any disclaimer, the term of this patent is extended or adjusted under 35 U.S.C. 154(b) by 73 days.

(21) Appl. No.: 15/211,440

(22) Filed: Jul. 15, 2016

(65) Prior Publication Data

US 2017/0018952 A1    Jan. 19, 2017

(30) Foreign Application Priority Data

Jul. 17, 2015   (DE) .................. 20 2015 005 102 U  
Sep. 4, 2015    (DE) ....................... 10 2015 114 873

(51) Int. Cl.

| | |
|---|---|
| *H02J 7/00* | (2006.01) |
| *H02J 7/02* | (2016.01) |
| *G06F 1/16* | (2006.01) |
| *A47B 97/00* | (2006.01) |
| *F16M 11/20* | (2006.01) |
| *F16M 11/24* | (2006.01) |

(52) U.S. Cl.  
CPC .............. *H02J 7/025* (2013.01); *A47B 97/00* (2013.01); *F16M 11/2021* (2013.01); *F16M 11/24* (2013.01); *G06F 1/16* (2013.01); *G06F 1/1601* (2013.01); *A47B 2097/003* (2013.01); *A47B 2097/005* (2013.01); *G06F 2200/1612* (2013.01); *G06F 2200/1631* (2013.01)

(58) Field of Classification Search  
CPC ........................... H02J 7/025; A47B 2097/005

USPC ......................................................... 320/108  
See application file for complete search history.

(56) References Cited

U.S. PATENT DOCUMENTS

| | | | |
|---|---|---|---|
| 4,552,418 A | 11/1985 | Sarnezki et al. | |
| 5,432,496 A * | 7/1995 | Lin .................. | B60Q 1/503 |
| | | | 340/457 |
| 5,663,868 A * | 9/1997 | Stalley ............ | H05K 7/20563 |
| | | | 165/80.3 |
| 6,532,152 B1 * | 3/2003 | White ............. | G02F 1/133308 |
| | | | 312/223.1 |
| 7,791,890 B2 * | 9/2010 | Ishida ............. | H05K 7/1492 |
| | | | 211/26 |
| 7,885,795 B2 * | 2/2011 | Rasmussen ...... | G06F 1/20 |
| | | | 361/688 |
| 8,403,736 B2 * | 3/2013 | Rasmussen ...... | H05K 7/20572 |
| | | | 361/695 |
| 9,089,216 B2 * | 7/2015 | Liu ................. | F16M 11/10 |
| 9,698,577 B2 * | 7/2017 | Yi .................. | H02B 1/20 |
| 2005/0105264 A1 * | 5/2005 | Chen .............. | G06F 1/1616 |
| | | | 361/679.27 |
| 2006/0082518 A1 * | 4/2006 | Ram ............... | G06F 1/1601 |
| | | | 345/1.1 |

(Continued)

FOREIGN PATENT DOCUMENTS

| | | |
|---|---|---|
| DE | 3235457 A1 | 3/1984 |
| DE | 19983832 T1 | 11/2001 |
| DE | 102009038675 A1 | 3/2011 |

*Primary Examiner* — M'Baye Diao  
(74) *Attorney, Agent, or Firm* — Harness, Dickey & Pierce, P.L.C.

(57) ABSTRACT

A screen rack for two screens, comprising a case for electric components, whereby power supply adapters for a PC and two screens that can be installed on the screen rack are arranged in the case.

10 Claims, 2 Drawing Sheets

(56) References Cited

U.S. PATENT DOCUMENTS

| | | | |
|---|---|---|---|
| 2009/0034181 A1* | 2/2009 | Gizycki | H01R 13/652 361/679.02 |
| 2009/0116174 A1* | 5/2009 | Strackbein | H02B 1/20 361/611 |
| 2010/0005625 A1* | 1/2010 | Chuan | G06F 1/1601 16/364 |
| 2012/0118327 A1* | 5/2012 | Mazmanyan | B08B 5/04 134/21 |
| 2012/0170175 A1* | 7/2012 | Silberbauer | H05K 7/1432 361/637 |
| 2013/0113421 A1* | 5/2013 | Han | H02J 7/0055 320/108 |
| 2013/0206706 A1* | 8/2013 | Ekholm | B01D 29/66 210/797 |
| 2014/0233205 A1* | 8/2014 | Gardes | G06F 1/1607 361/825 |
| 2015/0335158 A1* | 11/2015 | Grosswiller | A47B 97/00 211/26 |

* cited by examiner

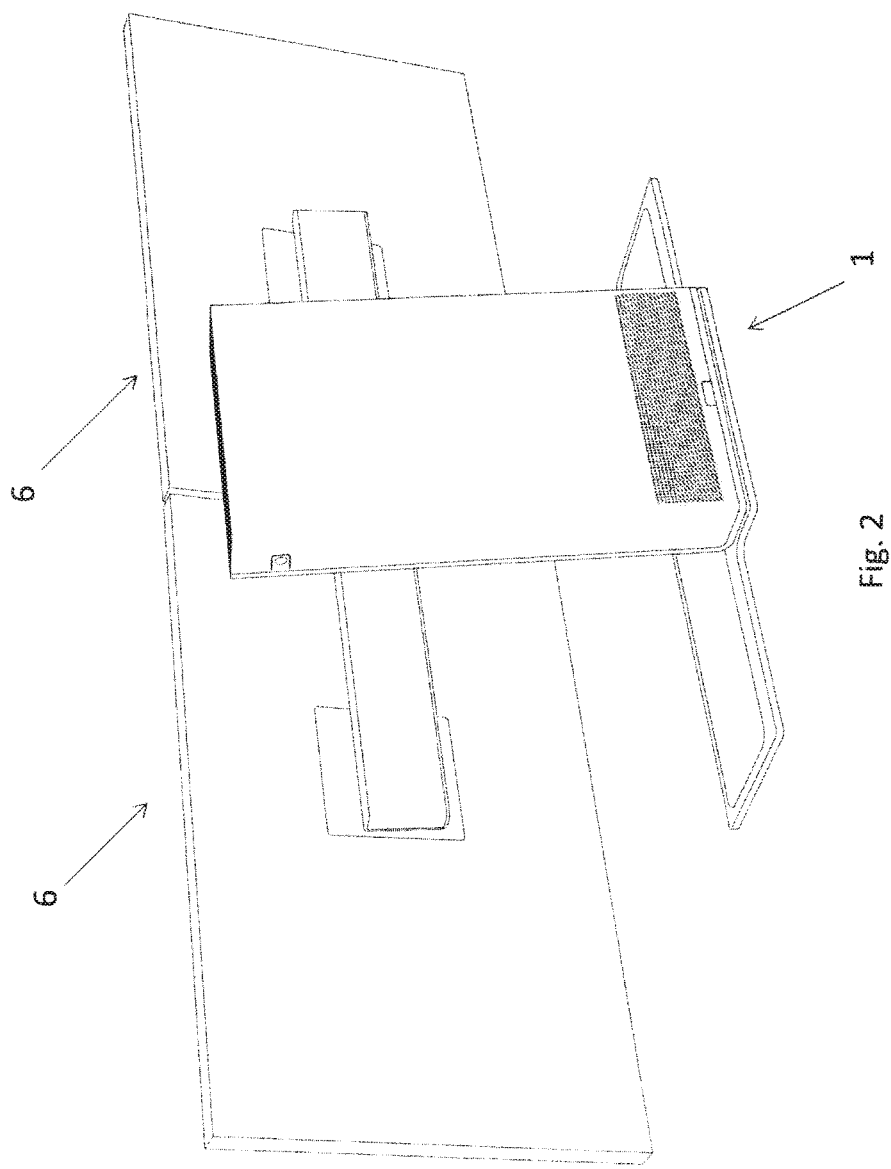

SCREEN RACK FOR TWO SCREENS WITH A CASE FOR ELECTRIC COMPONENTS

CROSS-REFERENCE TO RELATED APPLICATIONS

This application claims the benefit and priority of German Patent Application No. 20 2015 005 102.2 filed on Jul. 17, 2015 and German Patent Application No. 10 2015 114 873.0 filed on Sep. 4, 2015. The entire disclosures of the above applications are incorporated herein by reference.

BACKGROUND

This section provides background information related to the present disclosure which is not necessarily prior art.

TECHNICAL FIELD

The invention relates to a screen rack for two screens, comprising a case for electric components.

DISCUSSION

In the context of this invention, the term 'screen rack' refers to a holding device for a screen, especially for a flat screen for a personal computer (PC), whereby the holding device in accordance with its intended use can be placed upon an even surface as for example the working surface of a table or the like, so that a screen installed on the screen rack is located essentially at eye level of the user. Such a screen rack is generally known as a monitor stand or a monitor rack. The screen is not limited to a certain screen type and can be any type of screen, for example a LCD, LED or plasma screen.

Modern work stations are nowadays designed in a way as to suit the PC as a central working tool. In many visually oriented professions such as architecture or design, but also in other occupations such as stock exchange trading, text or image information is processed to a significant extent. The screens used in this context are therefore usually equipped with a particularly large screen area. The PC, the screen(s) and diverse peripheral devices require connections to the power grid and possibly to a data network that are generally ensured via appropriate connection wires, power supply adapters and ports. The connection wires, power supply adapters and ports that are necessary from a technical perspective are not directly required for the interaction of the user with the PC and/or the screen and can even affect the interaction in an unfavorable way. This entails the need to organize such connection wires, power supply adapters and ports as usefully and practically as possible.

The state of the art contains different approaches regarding the arrangement of electric components in a screen rack:

A monitor stand with constructive characteristics for the arrangement of devices, device components and/or ports for externally connectable accessories is for example known from the DE 20 2014 003 150 U1.

A monitor stand with an integrated multimedia device is known from the DE 10 2011 050 310 A1. This disclosure mainly focuses on using the structural design of the monitor stand for sound development.

The DE 101 01 108 A1 discloses a flat screen unit that is connected separately to a computer.

The DE 20 2008 014 953 U1 discloses a device to carry a screen and/or a monitor with an integrated computer.

The EP 1 244 000 A2 discloses a holder system for a flat screen with a drawer case with at last one computer connection port, whereby the computer can be inserted easily in the case.

The EP 1 530 118 A1 discloses an extension device for a flat screen with a computer module that is used for storage, transmission and processing of screen information.

SUMMARY OF THE INVENTION

The present invention is based on the purpose of providing a screen rack for PC screens with a large screen area that allows for an arrangement of the power supply components as usefully as possible so that the interaction of the user with the PC is optimized through the screen area and the functional reliability of the screen rack is enhanced.

To solve this problem, the invention according to claim 1 provides a screen rack for two screens, comprising a case for electric components whereby power supply adapters for a PC and two screens that can be installed on the screen rack are arranged in the case. The possibility of fastening two screens allows for a significant extension of the overall screen area at a relatively low cost. In case of a comparable resolution, a single screen with a large screen format is generally more expensive than two smaller screens with an identical overall screen area. The screen rack according to the invention simplifies cable routing in a considerable way as the power supply adapters of the PC and of the two screens can be interconnected within the case and fed through a joint power cable. Therefore, the power supply adapters do not need to be connected separately to a power grid. Also, functional reliability can be enhanced, among other aspects, through the simplified cable routing system. As part of the invention, the case has a joint section or several sections that are separated from each other, whereby the power supply adapters are arranged in a joint section or in different sections.

It can be advantageous if the case has at least one flexible and/or removable case section in order to open or close the case at least partially. The case can have for example a divided cover. The main circuit board of the PC is preferably covered by a rigid cover while the cover can be easily opened for the power supply adapters. Also, replaceable case sections can be provided for. For example, ports for external accessories are desired in some applications but not in others. To take account of the personal needs of certain customers, replaceable case sections with substantially identical dimensions can be installed, whereby the case sections in one variant provide ports for external accessories while they do not in another variant.

It can also be useful to have at least the main circuit board of the PC arranged in the case whereby the main circuit board of the PC preferably contains the central process unit (CPU) and possibly a hard drive memory of the PC. The power-consuming components are usually arranged on the main circuit board. The main circuit board of the PC is preferably interconnected with the respective power supply adapter of the PC within the case, whereby a connection wire between the power supply adapter and the main circuit board of the PC is located entirely within the case. Due to this, the screen rack can be designed in a particularly compact way and the functional reliability of the screen rack can be further increased.

It can be helpful if the power supply adapters for the PC and the screens that can be installed on the screen rack are supplied with power via a joint power cable, whereby the joint power cable is preferably designed as a double cable with an integrated network cable. Therefore, only one power cable needs to be connected to a power grid in order to supply all components that arranged in it with power. A connection to a data network can be created through the double cable at the same time.

A helpful aspect can be an essentially cuboid-shaped design of the case, whereby the case is preferably arranged in an upright position in which the smallest side areas of the cuboid point preferably to the bottom or the top and/or the largest side areas of the cuboid are forward- or backward-facing. The cuboid-shaped design of the case uses the available installation space in an ideal way, especially in case of the upright position. A cuboid has a total of six side areas with at least one pair of opposite side areas whose size is different from the remaining side areas of the cuboid. In case of six identical side areas there would be a cube. In this context, an upright position means that the largest side areas of the cuboid-shaped case and/or of the cuboid are facing neither upward nor downward, i.e. they are not facing (away from) the even base surface. Consequently, the cuboid-shaped case does not stand on its largest side areas and hence not in the most stable position that a cuboid can take. The case is preferable positioned in a way that the smallest side areas of the cuboid-shaped case are facing upward and/or downward while the largest side areas of the cuboid-shaped case are facing forward and/or backward, i.e. towards the rear of the screens and in the opposite direction. This spatial arrangement of the cuboid is similar to the spatial configuration of flat screens that, speaking in a generalizing way, have the shape of a cuboid whose largest side areas are forward- and/or backward-facing. Within the scope of this invention, sides that are facing each other confine an angle in the range of +/−30°, preferably in the range of +/−15°, preferably in the range of +/−5°, especially preferably of 0°. In case of a 0° angle, both areas have an exact parallel position.

It can be advantageous if the case has at least two vertically offset ventilation apertures between which at least one of the power supply adapters and/or the CPU is arranged so that the power supply adapter and/or the CPU is cooled by air that enters the case through the lower ventilation aperture and that flows out of the case through the upper ventilation aperture after heating by an exhaust air of the power supply adapter and/or the CPU. All heat-generating components, particularly all power supply adapters as well as the main circuit board of the PC with CPU, are preferably arranged between the two vertically offset ventilation apertures and are cooled by the air current through the vertically offset ventilation apertures. Preferably, a ventilator controlled by a thermostat, which is fastened between the ventilation apertures and which is preferably acoustically insulated, is installed in the case. Thereby, the convection cooling of the electric components is achieved effectively. The lower ventilation aperture is preferably located at the rear of the case. Thanks to this, the air can enter the lower ventilation aperture from the ambient without any obstacles. In particular, the inflow of air in the lower ventilation aperture is not hampered by the screens installed on the screen rack or by objects installed ahead of the case such as the keyboard. The upper ventilation aperture is preferably located on the top side of the case. Thereby, the heated exhaust air can escape in an upward direction without any obstacles. The outflow of the air is not hampered by the screens installed on the screen racks either. As the air outflow aperture is located behind the screens from the perspective of a user, the air outflow aperture is not visible and hence not suitable for the placement of items. In addition, the screens form a barrier in order to keep ventilation noises away from the user.

However, it can also be helpful if the screen rack is equipped with a mounting section that can be positioned on an even surface, whereby the mounting section is preferably located below the screens if two screens are installed on the screen rack in accordance with the intended use, whereby the mounting section is dimensioned especially preferably in a way that two identical screens can be installed next to each other on the screen rack in the horizontal format while the screen rack is standing on the even surface in a tilt-proof manner. Particularly, the mounting section should be sufficiently dimensioned to ensure that the screen rack will stand on the even surface in a tilt-proof way even if, for example, only one screen is installed and the screen rack consequently bears the weight of the screen on only one side, i.e. in an unbalanced manner. For this reason, it is advantageous if the mounting section has at least one width that is equivalent to the distance of the mounting ports of the two screens. Preferably, the width of the mounting section is even larger than the distance of the mounting ports of the two screens, preferably however smaller than the width of the two screens. According to this, the mounting section extends preferably below the screens and beyond the two mounting ports of the screens whereby both ends of the mounting section are preferably located below the screens. The mounting section comprises for example a (large) mounting plate whose shape is essentially equal to the projection surface of the screens from above onto the even base surface. Besides, a further (small) mounting plate, to which different functions can be assigned, can be arranged ahead of the (large) mounting plate in a central position.

It can also be convenient if the case has at least one cable throughput aperture, whereby the cable throughput aperture preferably points towards the rear of the screens in case the screens are installed on the screen racks in accordance with the intended purpose and whereby it is concealed by the screens. The cable throughput aperture is preferably designed with an oval and/or slit-like shape and extends for example in a top-to-bottom direction. A connection wire that is led through the cable throughput area between a screen installed on the screen rack and the associated power supply adapter and/or the main circuit board of the PC can thereby be moved flexibly when adjusting the height of or when tilting the screen in relation to the screen rack.

It can also be useful if the screen rack has a mounting section with ports to install two screens, whereby the ports are preferably designed according to the VESA (Video Electronics Standards Association) standard, whereby the mounting section is preferably adjustable for height and/or tilt, whereby preferably each individual port is tilt-adjustable in relation to the mounting section. Different mounting sections are preferably available for different screen formats. The mounting section is preferably designed in a rectangular shape and arranged in a way that the front side of the mounting section, on which the ports to attach the screens are located, is essentially aligned in parallel to the screen areas. The rear of the mounting section is preferably fastened on the case of the screen rack. A port according to the VESA standard has four holes at a distance of 100×100 mm that form a rectangle for a screen. A relevant mounting section provides two ports according to the VESA standard which are arranged respectively at a distance to each other as a function of the external dimensions of the screens.

It can be advantageous if the screen rack has an inductive charging area in order to inductively charge electric devices.

Therefore, a further charging cable connection, for example between a smartphone and the screen rack, can be omitted.

BRIEF DESCRIPTION OF THE DRAWINGS

FIG. 2 shows a computer-generated perspective view of the mounted screen rack.

DETAILED DESCRIPTION OF THE PREFERRED EMBODIMENT

Figure 1:
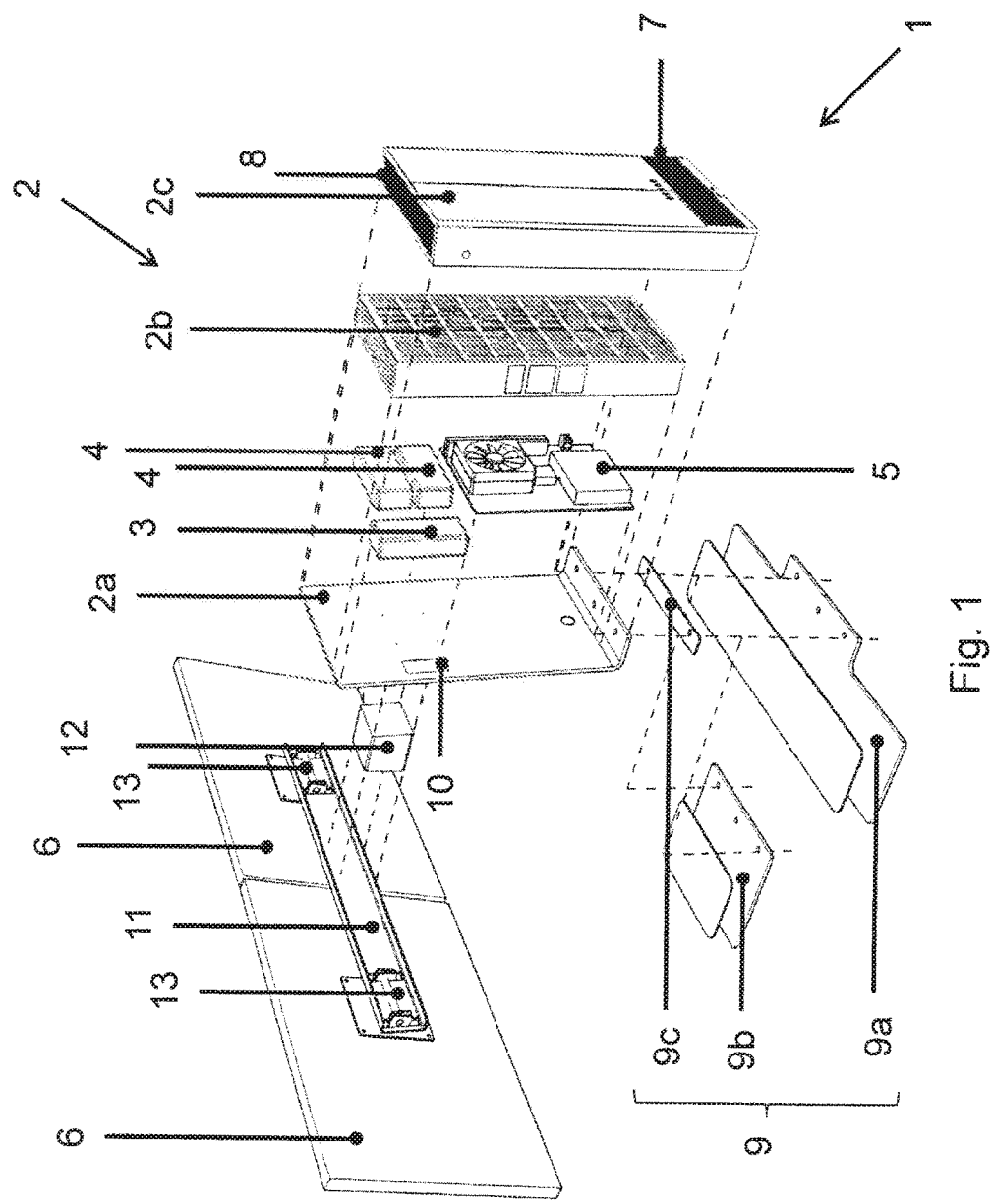
FIG. 1 shows an exploded perspective view of a screen rack according to the invention with a case to integrate electronic components, whereby power supply adapters for a PC and for two screens are arranged in the case and whereby the case absorbs the main circuit board of the PC.

The preferred embodiment of the invention shall be described with reference to the annexed Figures in the following.

Basic Functions of the Screen Rack 1

The screen rack 1 according to the preferred embodiment of the invention is a PC flat screen rack for the installation of two identical PC flat screens 6 with a diagonal screen size of preferably 15 to 27 inches so that the two PC flat screens 6 in the horizontal format (essentially horizontal position of the longer screen side) are positioned directly next to each other while the shorter screen sides are facing each other and the surfaces of the screens 6 are substantially flush in relation to each other. Also, other screen formats can be mounted next to each other if the mounting section 11 is designed accordingly. The mounting section 11 is designed with ports 13 for two screens 6 according to the VESA standard and is adjustable in height and tilt so that the two PC flat screens 6 can be moved simultaneously upwards and downwards in relation to the even base surface (table surface) as well as swiveled in relation to a horizontal swivel axis. The adjustability in height and/or tilt is optional.

Case 2 for Electric Components

According to the invention, the screen rack 1 comprises a cuboid-shaped and upward aligned case 2 to integrate electric components. In particular, the power supply adapters for a PC 5 and for screens 6 to be installed on the screen rack 1 are arranged in the case 2. The case 2 comprises a carrying case section and/or support section 2a that is mounted on a large mounting plate 9a via a spacer plate 9c and that is consequently linked to the mounting section 9 in a rigid way. On the side of the carrying case section 2a that points towards the screens 6, an ON/OFF switch is to be installed in a central position below the screens 6. If needed, there are USB slots and/or further ports for external accessories (e.g. SD card slot, etc.) on the side of the carrying case section 2a that points towards the screens 6 or on the two side areas of the case 2. The carrying case section 2a is essentially designed in a rectangular and plate-shaped manner and forms the support section of the screen rack 1. The carrying case section 2a is bent over a horizontal edge that extends in parallel to the shorter side of the rectangular form in order to form a mounting section for electric components on top of it as well as a mounting flange to fasten the mounting plate 9a underneath. The mounting section for the electric components is formed by the part of the case section 2a with the larger area and extends upwards at an angle of 75° to 105° in relation to the large mounting plate 9a. The mounting flange for fastening on the mounting plate 9a is formed by the part of the carrying case section 2a with the smaller area and is located on the lower end of the carrying case section 2a. The mounting flange extends in parallel to the large mounting plate on the side of the mounting section that faces away from the screens 6. The mounting flange of the carrying case section 2a, the spacer plate 9c and the large mounting plate 9a respectively have three compatible throughput apertures in order to be able to connect the components, for example by means of screws.

According to the invention, the case 2 formed by the screen rack 1 integrates the power supply adapters 3, 4 for a personal computer (PC) 5 and for the screens 6. The carrying case section 2a defines an intake for the electric components between the mounting section and the mounting flange. The power supply adapters 3, 4 and the PC 5 and/or its main circuit board with a central process unit (CPU) and at least one hard disc drive are mounted on the carrying case section 2a in a vertically offset position towards each other. An internal case section 2b that is to be installed on the carrying case section 2a forms a frame around the electric components. An external case section 2c is designed as a removable cover in order to be able to open or close the case 2 at least partially if needed.

Ventilation

The case 2 has two vertically offset ventilation apertures 7, 8 between which the electric components, i.e. the power supply adapters 3, 4 as well as the main circuit board of the PC 5, are arranged. The lower ventilation aperture 7 is located at the rear of the case, slightly above the contact surface of the screen rack 1. The upper ventilation aperture 8 is located on the top side of the case 2. Due to a chimney effect, the electric components are cooled through air that enters the case 2 through the lower ventilation aperture 7 and that flows out of the case 2 through the upper ventilation aperture 8 after heating through exhaust air of the electric components. The vertically offset arrangement of the electric components alongside the air current between the two ventilation apertures 7, 8 facilitates the air current within the case 2 due to the chimney effect so that the electric components are effectively cooled by means of convection. A ventilator controlled by a thermostat is installed on the CPU. This ventilator is acoustically insulated through its installation between the ventilation apertures 7, 8.

Cable Routing

The power supply adapters 3, 4 arranged in the case 2 for the PC 5 installed in the case 2 as well as for the screens 6 are interconnected within the case in such a way that only a single power cable has to be led out of the case 2 to a socket in order to connect all electric components to the power supply.

Connections

The power cable is designed as a double cable with an integrated network cable. The respective connections for the screens 6 as well as for a keyboard and/or mouse to use the PC 5 are preferably installed in or on the case 6. Alternatively, the network connection, the keyboard and/or the mouse and/or peripheral devices can also communicate with the PC 5 through relevant wireless interfaces (for example WLAN, Bluetooth, etc.) where possible and useful.

Materials

The structurally carrying parts of the screen rack 1 according to the invention, particularly the large and small mounting plates 9a, 9b, the spacer plate 9c, the carrying case section 2a as well as the internal and external case sections 2b, 2c, are preferably made of plastic or metal.

Inductive Charging Section

In a central position ahead of the mounting plate 9a, there is the small mounting plate 9b that is designed as an inductive charging surface for inductive charging of electric devices such as mobile phones or the like.

Benefits of the Invention

A significant advantage of the screen rack according to a variant of the invention is the provision of two ports to fasten two screens, whereby it is preferably possible to simultaneously adjust the height and tilt of the two screens. It is preferred to have the ports designed to fasten the screens according to the VESA standard in order to be able to install different screens on the screen rack according to the invention.

Another important benefit of the invention is the condition that the power supply adapters for the PC and the power supply adapters for the screens as well as diverse electric components and connections can be integrated in the case of the screen rack. Thereby, these electric components can be interconnected within the case so that only a single power cable is to be connected to a power grid in order to supply all electric components with electricity.

According to another variant of the invention, the mounting section is designed as an essentially rectangular or square-shaped plate and/or the case has a cuboid shape. The longitudinal sides of the cuboid are preferably aligned vertically. The smallest sides of the cuboid preferably point upwards or downwards, and the largest sides of the cuboid point towards the front or the rear. The emerging arrangement of shapes of the screen rack according to the invention is aesthetically attractive and at the same time functional as the rectangular mounting section ensures a stable position because the cuboid shape of the case uses the available installation space to integrate the electric components in an optimal way.

Further benefits in terms of aesthetic appearance and functional safety are created by the integrated cable management and the reduction of exposed cables.

What is claimed is:

1. A screen rack for two screens, comprising:
   a case for electric components, the case including at least two vertically offset ventilation apertures; and
   power supply adapters arranged in the case, the power supply adapters being for a PC and two screens that can be installed on the screen rack;
   wherein at least one of the power supply adapters is arranged between the at least two vertically offset ventilation apertures so that the at least one power supply adapter is cooled by air that enters the case through a lower one of the two vertically offset ventilation apertures and that flows out of the case through an upper one of the at least two vertically offset ventilation apertures after the power supply adapter is heated by exhaust air.

2. The screen rack according to claim 1, wherein the case has a flexible and/or removable case section in order to open or to close the case at least partially.

3. The screen rack according to claim 1, wherein at least a main circuit board of the PC is arranged in the case, and the main circuit board of the PC contains at least one of a central process unit and a hard disc drive of the PC.

4. The screen rack according to claim 1, wherein the power supply adapters for the PC and the two screens are supplied with power through a joint power cable, and the joint power cable is a double cable with an integrated network cable.

5. The screen rack according to claim 1, wherein the case is substantially a cuboid, and is aligned in an upright position with smallest side areas of the cuboid pointing upwards or downwards and/or largest side areas of the cuboid pointing frontwards or rearwards.

6. The screen rack according to claim 1, wherein a CPU of the PC is arranged between the two vertically offset ventilation apertures so that the CPU of the PC is cooled by the air that enters the case through the lower one of the at least two ventilation apertures and that flows out of the case through the upper one of the at least two ventilation apertures after the CPU of the PC is heated by the exhaust air.

7. The screen rack according to claim 1, wherein the screen rack has a mounting section configured to be positioned on an even surface, the mounting section is located exactly under the screens after the two screens are installed on the screen rack, and the mounting section is dimensioned so that the two screens are installed on the screen rack next to each other in a horizontal format while the screen rack is standing on the even surface.

8. The screen rack according to claim 1, wherein the case has at least one cable throughput aperture, the cable throughput aperture opens towards a rear of the screens after the screens are installed on the screen rack and the cable throughput aperture is concealed by the screens.

9. The screen rack according to claim 1, wherein the screen rack has a mounting section with ports for the installation of the two screens, the ports comply with Video Electronics Standards Association standard for display mounting, the mounting section is height-adjustable and/or tilt-adjustable, and each of the ports is tilt-adjustable in relation to the mounting section.

10. The screen rack according to claim 1, wherein the screen rack has an inductive charging surface in order to inductively charge electric devices.

* * * * *